Patented July 22, 1930

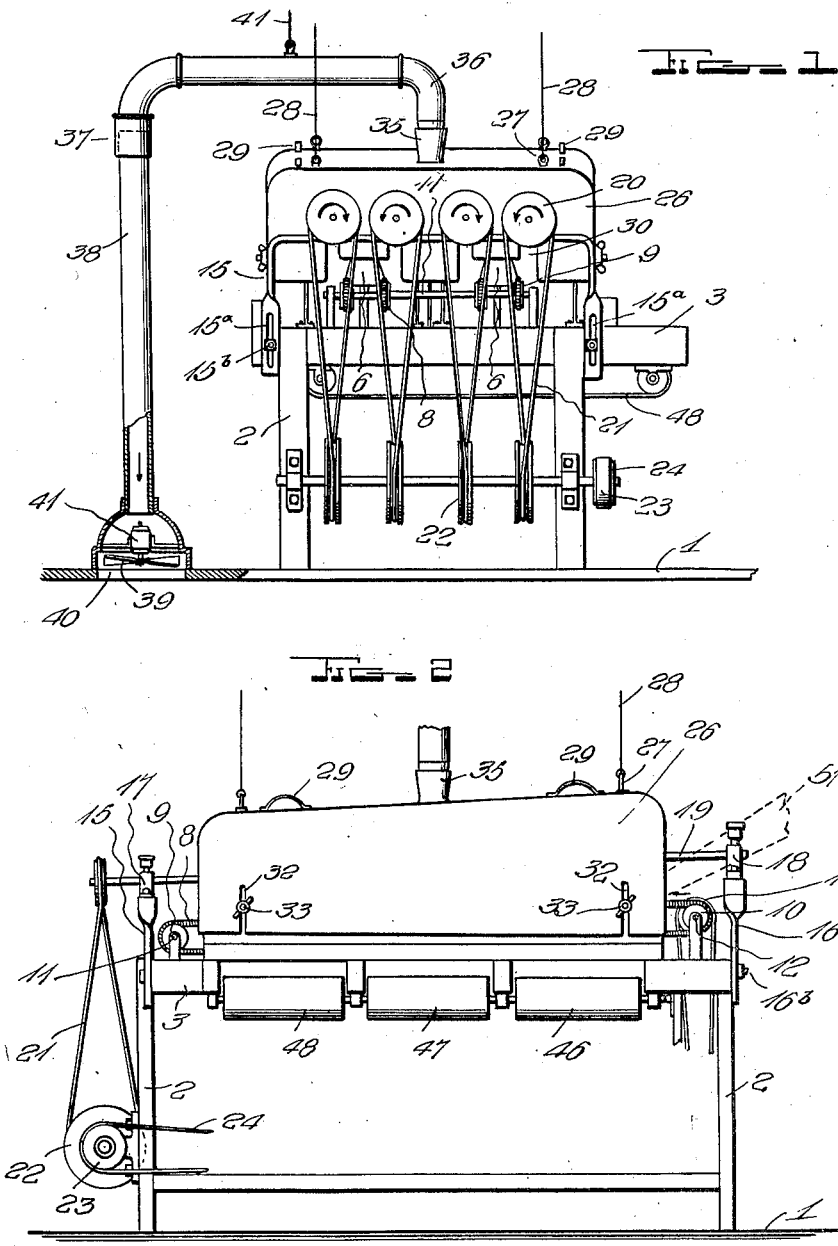

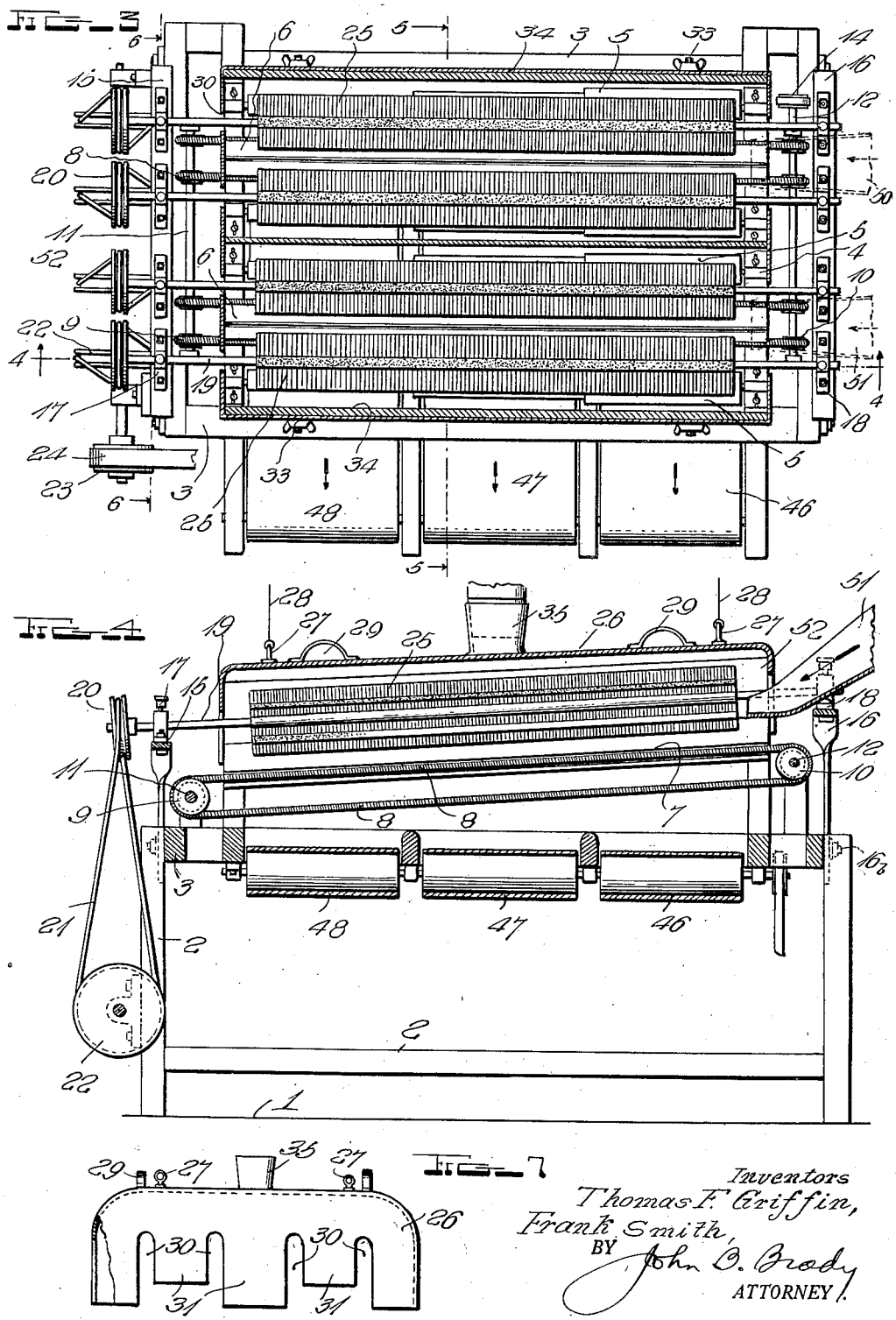

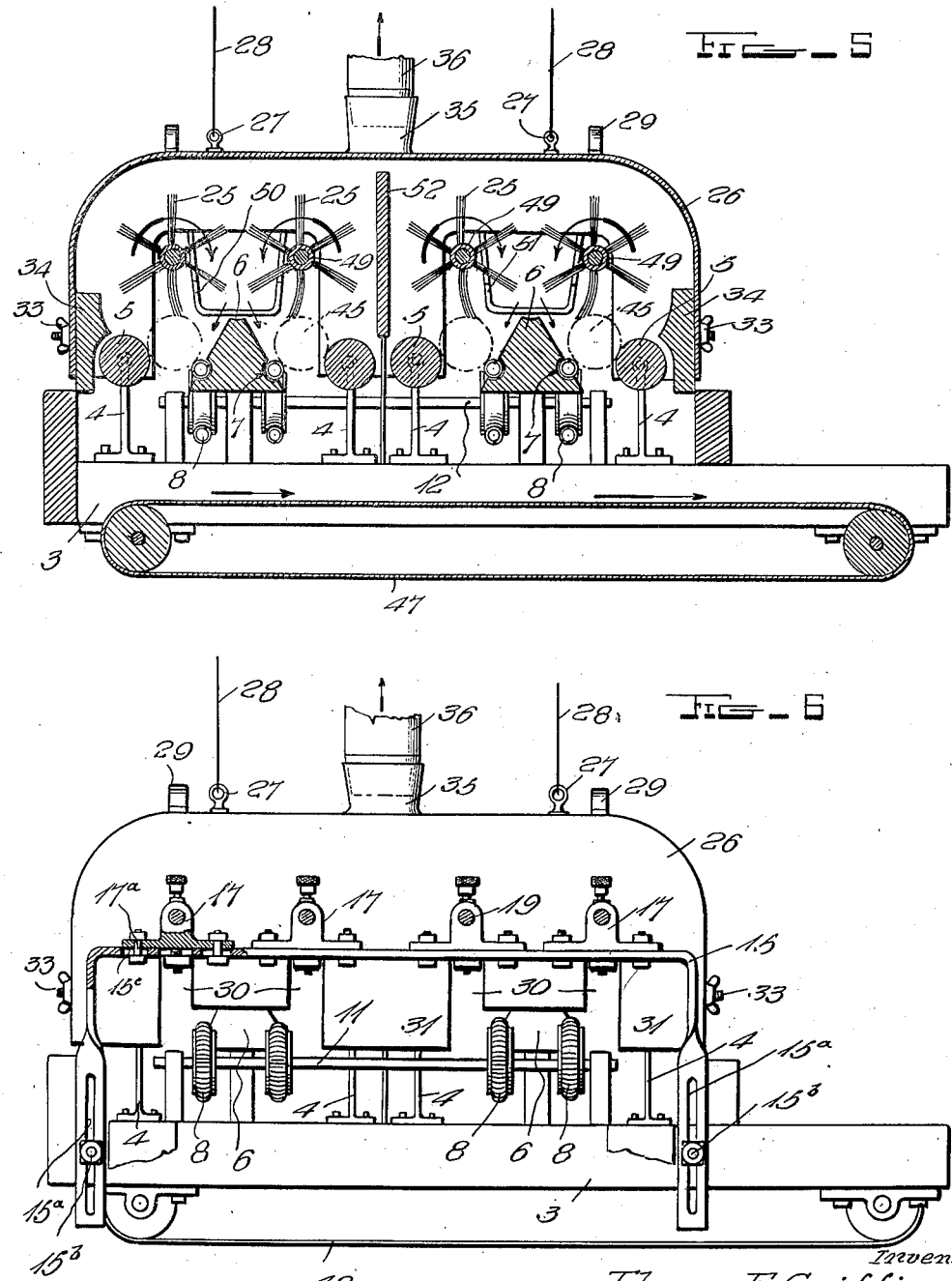

1,770,916

UNITED STATES PATENT OFFICE

THOMAS F. GRIFFIN AND FRANK SMITH, OF PINEHURST, NORTH CAROLINA

FRUIT GRADING AND POLISHING APPARATUS

Application filed September 8, 1928. Serial No. 304,782.

Our invention relates broadly to fruit grading apparatus and more particularly to an attachment for a fruit grader whereby the fruit may be scrubbed, cleaned and polished simultaneously with the grading process.

One of the objects of our invention is to provide an attachment for fruit graders which may be readily applied to various types of graders for insuring the removal of dust or dirt from the surface of the fruit, and permitting the polishing and brushing of the fruit for removing scale, fuzz and smut from the fruit without bruising or injuring the fruit in any manner while the fruit is being conveyed through the sizing apparatus.

Another object of our invention is to provide an attachment for a fruit grader in which a plurality of brushes may be mounted adjacent the sizing rollers of the fruit grader for brushing the surface of the fruit during the course of passage of the fruit through the grader with means for creating suction above the fruit for withdrawing the particles removed from the surface of the fruit, thus insuring the delivery of clean fruit of the proper selected sizes.

Still another object of our invention is to provide a construction of attachment for a fruit grader wherein the plurality of rotary brush members are positioned immediately adjacent the sizing rollers or bars of the fruit grader and driven by power derived from the mechanism which drives the moving parts from the fruit grader.

A further object of our invention is to provide a construction of cleaning mechanism for fruit which is being passed through a fruit grading apparatus where provision is made for enveloping the cleaning rollers of the apparatus within a suction casing or cover immediately above the grading rollers for removing particles brushed from the fruit and preventing the passage of such particles to the belt conveyors which deliver fruit of selected sizes to different points along the length of the grader.

Other and further objects of our invention reside in the structure of the suction apparatus arranged adjacent the fruit cleaning and grading rollers as set forth in more detail in the following specification and shown in the accompanying drawings, wherein:

Figure 1 is an end view of the cleaning attachment for fruit graders constructed in accordance with our invention; Fig. 2 is a side elevation of the attachment in position upon the fruit grader; Fig. 3 is a plan view of the apparatus with the suction casing shown in cross-section to give a view of the cleaning and grading rollers within the apparatus; Fig. 4 is a cross-sectional view through the apparatus taken on line 4—4 of Fig. 3; Fig. 5 is a lateral cross-sectional view through the cleaning and grading apparatus taken on line 5—5 of Fig. 3; Fig. 6 is an end view of the cleaning attachment taken on line 6—6 of Fig. 3; and Fig. 7 is an end view of the suction casing which is employed to house the cleaning apparatus on the grader.

We have found the attachment of our invention particularly advantageous when applied to peach grading and sizing machines. It often occurs that the harvested bulk of peaches contains fruit which may have dust dirt, scale, fuzz and smut particles adhering to the surface thereof, and in the ordinary type of grader the fruit passes through the grader after being selected in size and is crated substantially in the condition with respect to its surface as it was originally harvested. The consumer receives the fruit in a non-uniform state, that is, where some of the fruit may be covered with dust and dirt and substantial amounts of scale or fuzz and smut.

With our attachment for fruit graders, we have found a marked improvement in the appearance and marketing conditions of the fruit when it is created and when it is received by the consumer. The operation of our attachment is such that the surface of the fruit is thoroughly brushed, cleaned and polished, thereby removing dust, dirt, scale, fuzz, smut and other foreign matter. The operation is effected in a manner without bruising or injuring the fruit. We provide a plurality of longitudinally extending brushes which are mounted parallel to the grading rollers of the fruit grading machine. These brushes subject the surface of the fruit to a polishing action while the fruit is passing along the grading rollers. The brushes are journaled in a manner by which the spacial relation may be adjusted. Rotative movement is imparted to the brushes from the same power source which drives the moving parts of the fruit grader. In order to prevent the particles which are removed from the fruit from again contacting with the fruit as it passes along the conveyors which extend from the grader, we provide suction means in the form of a removable hood which entirely covers the brushes and creates a forced circulation of air over the brushes, tending to draw matter removed from the fruit through a central stack for discharge through a duct at a point remote from the grader.

Referring to the drawings in more detail, the fruit grader and polisher has been shown mounted upon the floor 1 of the harvesting shack. The frame structure of the fruit grader is illustrated at 2 including horizontally extending supporting means 3. Bracket members 4 are positioned upon the supporting beams 3 of such altitude as to impart the required inclination to the sizing rollers 5. The sizing rollers 5 extend in an inclined plane down which the fruit moves during the grading process. Between pairs of the sizing rollers longitudinally extending members 6 are provided which are cut away at each side thereof as represented at 7 to allow the passage of the endless band members 8 therein. The band members 8 are mounted on roller members 9 and 10 carried by laterally extending shafts 11 and 12 mounted upon the frame structure 3. The roller members are driven from a pulley 14 by means of a belt which extends from the driving apparatus that operates the grader. We provide bracket members 15 and 16 which engage opposite ends of the frame structure 3. The bracket members are substantially U shaped with their side portions twisted in a plane ninety degrees from the plane of the laterally extending portion of the bracket and slotted as at 15ª to enable bolt member 15ᵇ to be adjustably secured therethrough. The brackets are therefore free to be adjusted vertically to any selected position. The bracket 15 carries journal members 17 which are adjustable along the lateral portion of the bracket by means of bolt members 17ª operating in slots 15ᶜ of the bracket 15. Bracket 16 carries the adjustable journals 18 along the laterally extending portion thereof. The journals 17 and 18 form bearings for the longitudinally extending shaft members 19, which shafts project beyond the journals 17 and have pulley members 20 secured thereon. The shafts 19 carry rotatable brushes 25 formed by means of bristles which project radially from a longitudinally extending hub 49. The belts 21 pass over pulleys 20 and extend from aligned pulleys 22 which are driven from pulley 23 by means of belt 24 from the source of power which is used to drive the moving parts of the grader. Bristles 25 of the rotating brushes polish the surface of the fruit represented at 45 in Figure 5 for removing dust, dirt, scale, fuzz, smut or foreign matter from the fruit without bruising or injuring the fruit. In order to insure that the foreign matter may be immediately removed from the fruit grader, we provide hood 26 which forms a housing enclosing the rotating brushes. The hood 26 is in the form of a metallic housing substantially enclosed on all sides. The housing may be lowered into position on the fruit grader or elevated therefrom by means of vertically movable cables 28 which are secured to eyelets 27 anchored in the top of the casing. Any form of hoist mechanism may be employed for raising the cables 28. Hand grips 29 are provided on the casing 26 for elevating the casing. The casing is slotted at the ends as represented at 30 to permit the housing to be moved downwardly over the grader and substantially enclose the moving brushes. The intermediate panels 31 which remain as a result of the cutting away of the casing to form slots 30 may be provided with depending curtains of rubber or leather for closing in the housing at the ends thereof and insuring a better suction action upon the particles which are removed from the fruit. The sides of the housing are slotted at 32 to permit the wing nuts 33 to grip the sides of the casing 26 for maintaining the casing in position over the rotating brushes. Side beams 34 connect to the frame structure 3, permitting the rigid mounting of the casing 26 over the rotating brushes. The lower surfaces of side beams 34 conform closely to the varying size of the extreme outer grading rollers 5. A central suction port 35 is provided in the top of the housing 26 into which the stack 36 extends. The stack 36 forms part of a conduit which is vertically movable under control of cable 41 and sliding joint 37 to enable the casing 26 to be readily removed from the rotating brushes. This operation becomes necessary at times for the adjustment of the spacial relation of the grading rollers and the position of the rotating brushes. The rotating brushes may be moved within limits defined by the size of the slots 30. A stack 38 extends from a slidable joint 37 and is provided with a suction fan 39 adjacent the discharge outlet 40 which normally discharges the dust, dirt and fuzz particles below the floor of the harvesting shack. The ventilating fan 39 is driven by a suitable motor 41. We have shown the laterally extending conveyor belts positioned beneath the different sections of the grader rollers 5 as represented at 46, 47 and 48. The conveyor belts 46, 47 and 48 are driven from the source of power which also drives the endless belts 8 and from which the power is derived for driving the brushes 25. At one end of the grader the chutes 51 and 52 project into the housing 26 for delivering fruit to be graded and cleaned to a position where the fruit is free to roll down over the grading rollers 5. The fruit as it arrives at the harvesting shack is deposited upon an endless conveyor by which the fruit is carried to the chutes 50 and 51 for delivery over the grading rollers or bars. As the fruit moves down the grading rollers or bars, fruit of selected size passes between the grading bars. In the course of the movement of the fruit, the brushes 25 subject the surface of the fruit to a thorough cleaning. The elevation of the brushes may be changed in accordance with the character of the fruit supplied to the grader by raising or lowering brackets 15 and 16. The spacial relation between the grader bars or rollers 5 and the longitudinally extending members 6 may be readily changed and the spacial relation of the brushes may be changed, the hood 26 being raised to allow access to the parts for such adjustment. In order to separate the operations of the grader and the polisher into two independent portions, there is a partition plate 52 between the sets of brushes. In order to coordinate the movement of the fruit with the motion of the brushes, the cooperating sets of brushes are so driven as to turn toward each other thus cooperatively meeting the surface of the fruit as it moves down the chute and over the grading bars or rollers. We provide suitable leather or rubber curtain material to form a close or snug housing around the apertures in the hood 26 occasioned by the entrance of chutes 50 and 51 therein so as to facilitate withdrawal of the matter brushed from the surface of the fruit.

We have found the fruit cleaning attachment of our invention highly practical and successful in its operation. The improved appearance of the pack brought about by polishing the fruit and the cleanliness of the fruit has been found to improve the salability of the fruit and increase the satisfaction of the customer.

We have shown the brushes for purposes of illustration as having only one extended section but it will be understood that for purposes of economy and practicability, we construct the brushes of several aligned sections, any one of which may be replaced when any section becomes worn. The sections of the brushes may have bristles of different lengths in order to contact with and clean fruit of different sizes in the respective sections.

While we have described a preferred embodiment of the invention, we desire that it be understood that modifications may be made and that no limitations upon the invention are intended other than are imposed by the scope of the appended claims.

What we claim as new and desire to secure by Letters Patent of the United States is as follows:

1. Fruit grading and polishing apparatus comprising a frame structure, a plurality of sets of grading bars carried by said frame structure, a plurality of sets of polishing brushes mounted for rotation above said grading bars on axes having a direction coincident with the axes of said grading bars, and means for delivering fruit to be graded and polished at a point intermediate said grading bars and polishing brushes, and means for driving said brushes for subjecting the fruit to a polishing action simultaneously with the grading thereof.

2. A fruit grader and polisher comprising a frame structure, a multiplicity of fruit grading means, and a plurality of longitudinally extending rotary brushes disposed immediately above said fruit grading means for subjecting fruit to a polishing action simultaneously with the grading thereof, and suction means disposed over said rotary brushes for withdrawing matter removed from the surface of the fruit during the polishing and grading process.

3. Fruit grading and polishing apparatus comprising a frame structure, a plurality of longitudinally extending grading means disposed in an inclined plane on said frame structure, a plurality of longitudinally extending shaft members disposed parallel to said grading means in a plane substantially above the plane of the grading means, with the axes of said shaft members offset from the axes of said grading means, means for driving said shaft members, brushes carried by said shaft members, means for delivering fruit in a position above said grading means and below said brushes, means for advancing the fruit down the inclined plane during the grading process, while said fruit is subjected to the action of said brushes and suction means for withdrawing the matter removed from the fruit.

4. A fruit grader and polisher comprising a frame structure, a multiplicity of grading means disposed in an inclined plane on said frame structure, a plurality of brushes journaled longitudinally with respect to said grading means, with the axes of said brushes offset from the axes of said grading means, means for adjusting the spacial relation of said brushes, a hood enclosing said brushes and grading means, suction means connected to said hood, and means for delivering fruit at a position intermediate said brushes and grading means, whereby the fruit may be subjected to a polishing action under the influence of said brushes simultaneously with the grading thereof and the material removed from the fruit withdrawn from the operation of said suction means.

5. A fruit grader and polisher comprising a frame structure, grading means disposed in an inclined plane on said frame structure, a bracket at each end of the frame structure, a multiplicity of spacially adjustable bearings carried by each bracket, shaft members journaled in said bearings, brushes carried by said shaft members above said grading means, said grading means and said brushes being separated into cooperating sets with means extending longitudinally of said frame structure for separating one set from the other, each set being constituted by a pair of brushes rotatively driven toward each other for subjecting fruit delivered at points between the brushes and grading means to a polishing action simultaneously with the grading process.

THOMAS F. GRIFFIN.
FRANK SMITH.